3,088,837
PREPARATION OF PAINT COMPOSITIONS CONTAINING A PYRROLIDONE COMPOUND
Francis J. Prescott, Flushing, N.Y., and Emil A. Wich, Plainfield, N.J., assignors to General Aniline & Film Corporation, New York, N.Y., a corporation of Delaware
No Drawing. Filed Sept. 23, 1959, Ser. No. 841,698
8 Claims. (Cl. 106—262)

This invention relates to an improvement in the preparation of paint compositions containing a colored pigment and having a water-insoluble binder.

The term "paint composition" is employed herein to refer to liquid coating compositions which contain a pigment suspended in a liquid vehicle comprising a binder, and yielding a solid protective and/or decorative coating when applied as a film to a solid surface and dried. Paint compositions which contain water-insoluble binders are those in which the vehicle is a drying oil, or an oleo-resinous, resinous, spirit lacquer or latex emulsion type composition. Thus, the term "paint compositions" as applied to those having water-insoluble binders consists of oil paints, enamels, pigmented spirit varnishes or lacquers, latex emulsion type paints, and litho-varnishes employed for printing inks.

Colored pigments are conventionally incorporated in paint compositions, as above defined, having a water-insoluble binder, by milling the pigment with the liquid vehicle or a substantially non-aqueous liquid component thereof e.g. in a 3-roller mill or ball mill, in which the suspension is subjected to strong shearing action to effect comminution of the pigment and dispersion of its agglomerates, whereby the tinctorial effect of the pigment is enhanced and specks due to undispersed pigment particles or agglomerates are eliminated.

Milling operations of this type, as conventionally applied, are relatively expensive and time consuming, and it is an object of this invention to provide an improved process which substantially reduces the duration and intensity of the milling required to attain a given tinctorial value in a given composition, or correspondingly enhances the tinctorial value obtainable from such pigmented composition when subjected to a given milling treatment.

Pigments suitable for use in the process of this invention are dry finely divided organic or inorganic colored solids (i.e. other than white or black), as hitherto employed in the preparation of paint compositions, and which remain substantially undissolved in the vehicle of the paint composition. They are available in finely divided form, obtained by precipitation from solution, pulping, acid pasting and/or grinding in dry form.

In accordance with this invention, the milling of a colored pigment is effected in a substantially non-aqueous liquid component of the paint composition vehicle, comprising a pyrrolidone compound having the following formula:

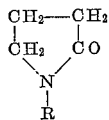

wherein R is a member of the group consisting of hydrogen, lower alkyl and lower alkenyl groups containing up to 4 carbon atoms. Such pyrrolidone compounds include 2-pyrrolidone, N-methyl-, N-ethyl-, N-isopropyl-, N-butyl- and N-vinyl-2-pyrrolidone. The remaining components (if any) of the paint composition are added to the milled composition.

The quantity of pyrrolidone compound present during the milling operation of this invention can be quite small, ranging upward from about 1% of the weight of pigment and from about 0.1% of the weight of the composition subjected to milling. Quantities as low as 5% of the weight of the pigment are highly effective, the concentrations of pyrrolidone compound in the mixture subjected to milling being as low as 0.3%. The proportion of pyrrolidone compound can be increased as desired, the ratio thereof to the pigment and the concentration in the mixture subjected to milling having no critical upper limit from the standpoint of effectiveness in increasing the tinctorial strength of the pigment, but being determined rather by considerations of economy, avoidance of excessive modification or dilution of the ultimate paint vehicle or composition, and the like. For most purposes, it is sufficient to use an amount of pyrrolidone compound not substantially exceeding twice the weight of the colored pigment.

The colored pigment can be milled even with the pyrrolidone compound alone, preliminary to incorporation thereof in the remainder of the paint composition, providing the pyrrolidone compound thus employed is sufficient in amount to yield a fluid paste suitable for milling and is not objectionable in the ultimate paint composition. For most purposes, it is preferred that the proportions of pyrrolidone compound in the ultimate paint composition should not exceed 10%.

The quantity of pigment present during the milling operation should not exceed that yielding a readily flowing liquid suspension in the paint composition vehicle or component with which it is milled. The milling can be effected at any desired lower pigment concentration. The selection of the component of the liquid substantially non-aqueous paint composition with which the pigment is to be milled may vary in accordance with the intended use of the milled product, and convenience in handling the mixture subjected to milling. In the case of spirit lacquers such as nitro-cellulose and/or vinyl-resin-solvent compositions, or drying oils intended to constitute the bulk of the vehicle (as in oleo-resinous enamels and paints or in litho-varnish), the pigment can be milled with the entire paint vehicle after addition of the pyrrolidone compound. Alternatively, a mass-tone product can be prepared by milling the pigment with drying oil to yield a concentrate which is later added to the remaining components of the paint vehicle.

In the case of latex type emulsion vehicles containing natural or synthetic resin latices, it is advantageous to mill the pigment solely with the pyrrolidone compound and to add the resulting milled suspension to the paint vehicle emulsion—the pyrrolidone compound being miscible with the aqueous as well as the organic phase of the composition.

The colored paint compositions which can be prepared advantageously in accordance with this invention include pigmented spirit lacquers containing as binders for example cellulose nitrate, or cellulose acetate and/or synthetic resins such as polyvinyl or alkyd resins dissolved in organic solvents (e.g., alcohols, esters, ketones, and/or hydrocarbons of the benzene series); further, enamels and litho-varnishes in which the binders may be bodied or alkyded drying oils which can be diluted with volatile solvents such as mineral spirits or hydrocarbons of the benzene series; lacquers and paints in which the binder can be an alkyd or other oleo-resin, with volatile diluents such as mineral spirits and hydrocarbons of the benzene series; and also emulsion type paints in which the binder may be a natural or synthetic latex of natural rubber or emulsified synthetic resin (e.g. alkyd, polyvinyl, polystyrene or polyacrylic resin) with an aqueous medium, the aqueous portion being either the disperse phase or the continuous phase. Pigments other than colored pigments (i.e. white or black pigments such as titanium oxide, zinc oxide, lithopone, carbon black) can also be present in the mixtures subjected to milling according to this invention which comprise a colored pigment and the pyrrolidone compound.

Paint compositions prepared in accordance with this invention are characterized by increased tinctorial strength, as compared with corresponding compositions prepared without inclusion of a pyrrolidone compound during the milling operation. Correspondingly, to attain a given tinctorial strength from the pigment in a given paint composition, substantial reduction can be made in the duration and intensity of the milling operation.

The invention will be more readily understood from the following examples. Parts, proportions and percentages referred to herein are by weight unless otherwise indicated.

*Example 1*

A series of colored lacquer samples was prepared by incorporating, in each case, 0.5 gram of colored pigment in a quantity of nitrocellulose lacquer having the following composition:

16.2 grams RS nitrocellulose (½ sec.)
7.4 grams Glyptal resin (ethylene glycol-phthalic anhydride condensate)
12.0 grams methanol
16.8 grams ethanol
5.8 grams butanol
14.0 grams ethylacetate
3.9 grams butylacetate
5.4 grams toluene
4.0 grams xylol
4.6 grams dibutyl phthalate The pigments employed were Milori Blue, Toluidine Red and Phthalocyanine Green. A similar set of samples was prepared, to each of which was added 0.7 gram of N-methyl pyrrolidone. Two additional samples were prepared with Milori Blue, adding respectively 0.3 gram of N-methyl pyrrolidone and 0.7 gram of N-vinyl pyrrolidone.

Each of the samples was placed in an 8 ounce jar with an equal weight of ⅜" porcelain balls, and the contents ball-milled by rolling for 8 hours. The milled samples from each pigment were compared for tinctorial strength after applying them as a coating on aluminum paper. The samples containing the pyrrolidone compound were found to have a substantially higher tinctorial strength than the corresponding samples lacking this additive. The results were as follows:

| Pigment | Additive | Increase in Tinctorial Strength, percent |
|---|---|---|
| Milori Blue | 0.7 g. methyl pyrrolidone | 10 |
| Do | 0.3 g. methyl pyrrolidone | 10 |
| Do | 0.7 g. vinyl pyrrolidone | 5 |
| Toluidine Red | 0.7 g. methyl pyrrolidone | 5 |
| Phthalocyanine Green | do | 5 |

*Example 2*

Two samples of pigmented vinyl lacquer were prepared by mixing, in each case, 0.5 gram of colored pigment with a vinyl lacquer having the following composition:

16 grams methyl-ethyl-ketone
17 grams methyl-isobutyl-ketone
9 grams di-n-amyl-ketone
18 grams toluene The pigments employed were Milori Blue and Toluidine Red. Similar samples were prepared to which were added small amounts of N-methyl pyrrolidone or N-vinyl pyrrolidone, and the samples were ball milled for 8 hours as in the procedure of Example 1. The milled samples were coated on aluminum paper and the coatings prepared with samples containing a pyrrolidone derivative were compared for tinctorial strength with the corresponding sample containing no pyrrolidone derivative. The results were as follows:

| Pigment | Additive | Increase in Tinctorial Strength, percent |
|---|---|---|
| Milori Blue | 0.7 g. methyl pyrrolidone | 10 |
| Do | 0.7 g. vinyl pyrrolidone | 5 |
| Do | 0.3 g. vinyl pyrrolidone | 5 |
| Toluidine Red | 0.7 g. methyl pyrrolidone | 5 |
| Do | 0.7 g. vinyl pyrrolidone | 5 |

*Example 3*

Pigmented litho-varnish samples were prepared by adding 50 mg. of colored pigment to 5 g. of a litho-varnish consisting of two parts of zinc oxide and one part of bodied linseed oil varnish. For comparison, similar samples were made, adding in each case 20 mg. of N-methyl pyrrolidone or N-vinyl pyrrolidone. Each sample was blended with a spatula on the base plate of a Hoover automatic muller (A.S.T.M. D–387–52T) in which each sample was then subjected to 4 cycles of 25 revolutions each at 150 lbs. pressure. Draw-downs were then made from each sample, and the increase in tinctorial strength observed by comparison of the coatings from samples containing a pyrrolidone derivative with a coating from the corresponding sample containing no pyrrolidone additive. The results were as follows:

| Pigment | Additive | Increase in Tinctorial Strength, percent |
|---|---|---|
| Phthalocyanine Blue | Methyl pyrrolidone | 15 |
| Do | Vinyl pyrrolidone | 10 |
| Milori Blue | Methyl pyrrolidone | 7 |
| Chrome Oxide Green | do | 30 |
| Phthalocyanine Green | do | 25 |
| Do | Vinyl pyrrolidone | 10 |
| Toluidine Red | Methyl pyrrolidone | 10 |
| Dioxazine Violet | do | 10 |

*Example 4*

A series of mass-tone samples was prepared by incorporating in each case 1 gram of pigment in 4 grams of bodied linseed oil varnish. A similar set of samples was prepared, but there was added to each 0.05 g. of N-methyl-pyrrolidone. The mass-tone compositions were milled on a Hoover automatic muller for 4 cycles of 25 revolutions each at 150 lbs. pressure. The samples were then bleached by mixing 1 gram of each with 50 grams of a zinc white ink containing three parts of zinc oxide to one part of bodied linseed oil varnish. The samples containing N-methyl-pyrrolidone were compared with the corresponding samples lacking this additive as to fineness, measured on a Hegeman scale (A.S.T.M. D–1210–54), and also as to tinctorial strength after coating on paper. The results were as follows:

| Pigment | Comparative Fineness | | Increase in Tinctorial, Strength, percent |
|---|---|---|---|
| | With Methyl Pyrrolidone | Control Sample | |
| Phthalocyanine Blue | 5–6 | 4–5 | 25 |
| Alkali Blue | 2–3 | 1–2 | 20 |
| Milori Blue | 2–3 | 1–2 | 15 |
| Chlorinated Isoviolanthrone | 4–5 | 3–4 | 30 |

*Example 5*

A series of pigmented alkyd lacquers was prepared by combining 1 gram of pigment with 5 grams of an alkydized soya bean oil, and a corresponding set of samples was prepared which contained in addition 0.05 grams of N-methyl-pyrrolidone. The samples were mixed on a Hoover automatic muller employing 4 cycles of 50 revolutions each at 150 lbs. pressure. The resulting mixtures were let down in a blending base consisting of 7.2% titanium oxide and 92.8% of a vehicle composed of 45% mineral spirit, 5% cobalt naphthenate and 50% of a soya alkyd resin (prepared from 42% soya bean oil, 6% glycerine and 42% phthalic anhydride). Increase in tinctorial strength was then determined by comparison of drawdowns prepared from the samples containing N-methyl pyrrolidone with drawdowns from the corresponding samples lacking a pyrrolidone additive. The results were as follows:

| Pigment | Ratio Blending Base Pigment/ Concentrate | Increase in Tinctorial Strength, percent |
|---|---|---|
| Phthalocyanine Blue | 30 | 25 |
| Do | 20 | 20 |
| Phthalocyanine Green | 30 | 15 |
| Dioxazine Violet | 30 | 5 |
| Lithol Red 2G | 30 | 5 |
| Norwood Green | 30 | 15 |

*Example 6*

Two samples of a pigmented alkyd resin lacquer were prepared by incorporating 20 grams of pigment (Milori Blue in one case, and Toluidine Red in the other) in a mixture of 200 grams of an alkyd base resin (prepared from 42% soya bean oil, 42% phthalic anhydride and 16% glycerine) with 70 grams of xylol. A similar set of samples was prepared wherein 10 grams of the xylol were replaced by a similar quantity of N-methyl-pyrrolidone.

The four samples were ball milled by rolling for 72 hours in jars containing an equal quantity by weight of ⅜ inch porcelain balls. 10 grams of each of the resulting dispersions were let down in 40 grams of an enamel composed of 58% titanium oxide, 4% cobalt naphthenate, 22% mineral spirit and 16% of the aforesaid alkyd base resin. Comparison of coatings prepared from the let down samples on paper indicated that the tinctorial strength of the samples containing N-methyl-pyrrolidone amounted to 15% in the case of Milori Blue and 5% in the case of Toluidine Red.

*Example 7*

Pigmented alkyd lacquers were prepared by incorporating 5 grams of pigment in 20 grams of alkydized soya bean oil, and control samples were similarly prepared in which part of the vehicle was replaced by a like amount of methyl pyrrodidone. The ingredients of each sample were first blended with a spatula on a glass plate and then ground of a 3-roller mill, portions of each of the samples being removed after 2 passes and then after 4 passes. 10 grams of each of the samples thus obtained were let down in 40 grams of a blending base as described in Example 5 and then coated on paper. Comparison of coatings from the samples containing N-methyl pyrrolidone with those obtained from corresponding control samples lacking it indicated increased tinctorial strength in the former, as follows:

| Pigment | Vehicle, grams | Methyl Pyrrolidone Content, grams | Increase in Tinctorial Strength, percent | |
|---|---|---|---|---|
| | | | After 2 Passes | After 4 Passes |
| Phthalocyanine Blue | 19.7 | 0.3 | 15 | 25 |
| Chrome Green | 19.0 | 1.0 | 10 | 15 |

*Example 8*

A mixture of 100 grams of iron oxide yellow with 10 grams of Phthalocyanine Blue was ball milled with 160 grams of N-methyl-pyrrolidone for 24 hours. Two control mixtures were similarly prepared, employing water in the one case and xylol in the other instead of N-methyl-pyrrolidone. 5 gram portions of the N-methyl pyrrolidone dispersions were let down in 50 gram portions of a number of commercial paint vehicles including non-aqueous as well at latex emulsion types, the methyl-pyrrolidone paste being compatible with aqueous as well as organic solvent systems. Control samples for comparison were made by letting down 5 gram portions of the xylol paste in the non-aqueous paint vehicles and 5 gram portions of the water paste in the latex emulsion type vehicles. As compared with the control samples prepared with water and xylol, those prepared with N-methyl pyrrolidone possessed approximately 50% greater tinctorial strength in each case. The paint vehicles employed were the base alkyd resin solution of Example 5, a commercial oleoresinous paint, a commercial enamel, a polyvinylacetate latex emulsion, a butadiene-styrene copolymer latex emulsion, an alkyd resin latex emulsion and a styrene-acrylic copolymer latex emulsion.

In the foregoing examples, proportions—particularly of pigment and pyrrolidone compound—can be varied substantially within the range indicated in the introductory paragraphs. In some cases, no substantial change occurs in the improved tinctorial effect produced in accordance with the invention, even though the proportion of pyrrolidone compound is varied within the aforesaid range. Thus, as shown in Example 1, the improved tinctorial value for Milori Blue remains the same regardless whether 0.3 or 0.7 gram of N-methyl-pyrrolidone was present in the mixture subjected to milling. A similar relationship appears in Example 2 in milling the same pigment with a vinyl lacquer containing similar amounts of N-vinyl-pyrrolidone.

Intead of N-methyl-pyrrolidone and N-vinyl-pyrrolidone employed in the examples, there can be substituted to similar advantage similar amounts of 2-pyrrolidone, N-ethyl-, N-isopropyl- or N-butyl pyrrolidone.

Variations and modifications which will be obvious to those skilled in the art can be made in the process and compositions herein described without departing from the scope of the invention.

We claim:

1. In the preparation of a colored paint composition having a water-insoluble binder, the improvement which consists in milling a mixture of a colored pigment with a non-aqueous liquid component of said composition comprising a pyrrolidone compound having the formula

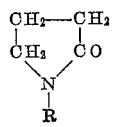

wherein R is a member of the group consisting of hydrogen and alkyl and alkenyl groups having up to 4 carbon atoms, any additional components of said composition being subsequently incorporated with the resulting milled mixture, the amount of said pyrrolidone compound being at least 1% of the weight of the colored pigment and at least 0.1% of the weight of the mixture subjected to milling, and not substantially exceeding 10% by weight of the ultimate paint composition.

2. A process as defined in claim 1 wherein the amount of said pyrrolidone compound is at least 5% by weight of the colored pigment, and at least 0.3% of the weight of the mixture subjected to milling.

3. A process as defined in claim 1 wherein the pyrrolidone compound is N-methyl-pyrrolidone.

4. A process as defined in claim 1 wherein the pyrrolidone compound is N-vinyl-pyrrolidone.

5. The process of preparing a colored paint composition having a water-insoluble binder, which comprises milling a fluid mixture consisting essentially of a colored pigment and a pyrrolidone compound having the following formula:

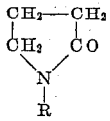

wherein R is a member of the group consisting of hydrogen and alkyl and alkenyl groups of up to 4 carbon atoms, and adding the resulting mixture to the liquid vehicle of said paint composition containing said water-insoluble binder, the amount of said pyrrolidone compound being at least 1% of the weight of the colored pigment and at least 0.1% of the weight of the mixture subjected to milling, and not substantially exceeding 10% by weight of the ultimate paint composition.

6. A process as defined in claim 5 wherein said paint composition vehicle is oleoresinous.

7. A process as defined in claim 5 wherein said paint composition vehicle is a latex emulsion.

8. A colored pigment composition suitable for incorporation in paint compositions of which the vehicle contains a water-insoluble binder consisting essentially of a milled fluid mixture of a colored pigment and a pyrrolidone compound having the formula:

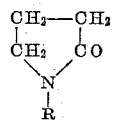

wherein R is a member of the group consisting of hydrogen and alkyl and alkenyl groups of up to 4 carbon atoms.

References Cited in the file of this patent

UNITED STATES PATENTS

| | | |
|---|---|---|
| 2,791,589 | Pugin | May 7, 1957 |
| 2,804,455 | Dorlars | Aug. 27, 1957 |
| 2,816,114 | Erich | Dec. 10, 1957 |
| 2,846,331 | Rahl | Aug. 5, 1958 |
| 2,846,332 | Nesty | Aug. 5, 1958 |
| 2,857,400 | Cooper | Oct. 21, 1958 |

FOREIGN PATENTS

| | | |
|---|---|---|
| 707,681 | Great Britain | Aug. 21, 1953 |
| 711,677 | Great Britain | July 7, 1954 |
| 822,084 | Germany | Nov. 22, 1951 |

OTHER REFERENCES

H. C. Olpin et al.: The Journal of the Soc. of Dyers and Colorists, vol. 69, No. 10, pp. 357–362, October 1953.